(12) United States Patent
Onishi et al.

(10) Patent No.: US 6,871,836 B1
(45) Date of Patent: Mar. 29, 2005

(54) ELECTROMAGNETIC VALVE FOR VARIABLE DISCHARGE FUEL SUPPLY APPARATUS

(75) Inventors: Yoshihiko Onishi, Tokyo (JP); Kouichi Ojima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/111,195

(22) PCT Filed: Aug. 24, 2000

(86) PCT No.: PCT/JP00/05706

§ 371 (c)(1),
(2), (4) Date: Aug. 6, 2002

(87) PCT Pub. No.: WO02/16755

PCT Pub. Date: Feb. 28, 2002

(51) Int. Cl.[7] .............................................. F16K 31/02
(52) U.S. Cl. .............................. 251/129.15; 251/129.07
(58) Field of Search ....................... 251/129.01–129.22, 251/142–142.9

(56) References Cited

U.S. PATENT DOCUMENTS

| 4,474,332 | A | * | 10/1984 | Kaska .................. | 251/129.14 |
| 4,890,794 | A | | 1/1990 | Bosch | |
| 4,984,549 | A | * | 1/1991 | Mesenich .............. | 251/129.15 |
| 5,065,979 | A | * | 11/1991 | Detweiler et al. ..... | 251/129.16 |
| 5,217,047 | A | * | 6/1993 | McCabe ................ | 251/129.18 |
| 6,000,677 | A | * | 12/1999 | Cook et al. ............ | 251/129.07 |

FOREIGN PATENT DOCUMENTS

| EP | 0 481 608 A1 | 4/1992 |
| EP | 0 740 068 A2 | 10/1996 |
| EP | 0 740 071 A2 | 10/1996 |
| JP | 08 338341 A | 12/1996 |
| JP | 10-176625 | 6/1998 |
| JP | 10-299611 | 11/1998 |
| JP | 11-200990 | 7/1999 |

* cited by examiner

Primary Examiner—Paul J. Hirsch
(74) Attorney, Agent, or Firm—Sughrue Mion, PLLC

(57) ABSTRACT

The object of the present invention is to provide an electromagnetic valve for a variable discharge fuel supply apparatus with improved relief property and high-responsiveness, a small electromagnetic valve, reduced electric current consumption and increased responsiveness, wherein the valve seat has a valve seating surface present in a flat surface facing the direction of movement of the valve at substantially right angle, and the valve is provided with a flow path formed within the valve and a substantially ring-shaped flat landing surface that encircles the flow path within the valve and closes the flow path by coming into contact with the valve seating surface. The electromagnetic valve may be made to cause the outside of the valve to serve as a high pressure side and the flow path within the valve, as a low pressure side, and to cause both the landing surface of the valve and the valve seating surface of the valve seat to be in ring-shaped so that the valve and the valve seat come into contact only through the space between the outer boundary of the landing surface of the valve and the inner boundary of the valve seating surface of the valve seat. Further, the flow path may be formed in a place where it passes the vicinity of said electromagnetic solenoids at the downstream section of the valve. In addition, the flow path within the valve may extend piercing the valve to reach as far as the vicinity of the solenoid coils, and may be connected to the fuel flow path that is formed in the space between the valve outer boundary and the valve holder inner boundary and linked to the low pressure side, and the valve seat having the valve seating surface may be a part formed separately from the valve holder instead of the one united to the valve holder.

7 Claims, 11 Drawing Sheets

OPENING AREA
$$S = (\pi/4) \cdot d_2 \cdot \ell$$

SPRING FORCE
$$F = (\pi/4)(D_1^2 - D_2^2)(P_2 - P_1)(1/2)$$

ELECTROMAGNETIC VALVE FOR VARIABLE DISCHARGE FUEL SUPPLY APPARATUS

TECHNICAL FIELD

This invention relates to an electromagnetic valve for a variable discharge fuel supply apparatus, and in particular to an electromagnetic valve for a variable discharge fuel supply apparatus that makes it possible to supply high-pressure fuel by adjusting the fuel's flow rate from a fuel pump.

BACKGROUND ART

A fuel supply system of the fuel injection type in an internal combustion engine for automobiles is generally the like shown in FIG. 13, wherein fuel 2 in a fuel tank 1 is sent out of the fuel tank 1 by a low-pressure pump 3, filtered through a filter 4 and, following receiving pressure adjustment by a low-pressure regulator 5, supplied to a fuel supply apparatus 6, or a high-pressure pump. Fuel is rendered high pressure by the fuel supply apparatus 6 only in the quantity necessary for fuel injection and supplied into common rails 9 of an internal combustion engine (not shown). The remainder of the fuel is released through an electromagnetic valve 17 into the space between a low-pressure damper 12 and a suction valve 13. The quantity necessary for fuel injection is determined by a regulation unit (not shown), which also regulates the electromagnetic valve 17. The high-pressure fuel thus supplied is injected in high-pressure spray into a cylinder (not shown) of an internal combustion engine from a fuel injection valve 10 connected to the common rails 9. A filter 7 and a high-pressure relief valve 8 open in the event of unusual pressures within the common rails 9 (the high-pressure relief valve opening pressures) to prevent the failure of the common rails 9.

The fuel supply apparatus 6, or a high-pressure pump, comprises a filter 11 for filtering the supplied fuel, the low-pressure damper 12 for absorbing the pulses of low-pressure fuel, and a pump 16 that applies pressure to the fuel supplied through the suction valve 13 and discharges the high-pressure fuel through a discharge valve 14 and a fuel pressure holding valve 15. A fuel pressuring room 103 constituted by a plunger 100, a sleeve 101 and a plate 102 of the pump 16 plus the suction valve 13 and the discharge valve 14 is linked to the space between the low-pressure damper 12 and the suction valve 13 via the electromagnetic valve 17. A fuel supply apparatus like the fuel supply apparatus 6 is a variable discharge fuel supply apparatus because the discharge of fuel can be adjusted and is variable via the electromagnetic valve 17, and the electromagnetic valve 17 used in such a fuel supply apparatus is an electromagnetic valve for a variable discharge fuel supply apparatus.

FIG. 14 shows the details of a structure of a conventional variable discharge fuel supply apparatus like this. In FIG. 14, the fuel supply apparatus 6, or a high-pressure pump, comprises integrally a casing 21, the pump 16, or a plunger pump disposed within the casing 21, the electromagnetic valve 17 connected to the fuel pressuring room 103 that is constituted by the plunger 100, the sleeve 101 and the plate 102 of the pump 16 plus the suction valve 13 and the discharge valve 14, and the low-pressure damper 12. The details of the structure of the electromagnetic valve 17 are as shown in FIG. 15. Through the activation of solenoids 22 of the electromagnetic valve 17, the electromagnetic valve 17 opens at the time when fuel is discharged in the quantity required by the regulation unit (not shown) during the discharge process of the pump 16 to release fuel from the fuel pressuring room 103 to the low-pressure space between the low-pressure damper 12 and the suction valve 13 (FIG. 13), thus lowering the pressure within the fuel pressuring room 103 to a level below the pressure in the common rails 9 and opening the discharge valve 14. Once opened, the electromagnetic valve 17 remains so till the pump 16 is shifted to the suction process. It is so designed that the quantity of fuel to be discharged to the common rails 9 can be adjusted through the control of the timing of opening of the electromagnetic valve 17.

In FIG. 15, the electromagnetic valve 17 for a variable discharge fuel supply apparatus comprises an electromagnetic valve body 24 being accommodated within the casing 21 and having a fuel flow path 23 within, a valve seat 25 disposed within the fuel flow path 23 of the electromagnetic valve body 24, a valve 26 for opening or closing the fuel flow path by coming into or out of contact with the valve seat 25 within the electromagnetic valve body 24, and a compression spring 27 for compressing the valve 26 to the valve seat 25.

An electromagnetic valve like the electromagnetic valve 17 for a variable discharge fuel supply apparatus, in which a plunger piston is driven up and down in FIG. 14 by the driving cam disposed coaxially with the unillustrated engine camshaft sucks up and discharges fuel. During the process, through the opening of the electromagnetic valve 17 at the time when a certain quantity of fuel has been discharged into the common rails 9, the high-pressure fuel in the fuel pressuring room 103 is released to the suction side at a lower pressure. Through the control of the timing of opening of the electromagnetic valve 17, the discharge from the fuel supply apparatus is variably adjusted and controlled.

FIG. 16 is a schematic partial sectional view showing the electromagnetic valve 17 in a state in which it is in an open position to the valve seat 25. FIG. 17 is a schematic partial sectional view showing the valve 26 of the electromagnetic valve 17 in a state in which it is in a closed position to the valve seat 25. In the conventional electromagnetic valve 17, a ball seal is used, and it is so constituted that the high-pressure side is in the direction opposing to the spring 27 with the valve seat 25 being taper-shaped and the valve 26 being ball-shaped. The opening area (mm$_2$) relative to the valve lift (mm) in the electromagnetic valve 17 like this is as expressed by the equation shown in FIG. 16, and varies in a way as shown in the graph given in FIG. 18. The strength (N) requisite for the spring to cope with the varying seat diameter (mm) is as expressed by the equation shown in FIG. 17, and varies in a way as shown in the graph given in FIG. 19 (showing the case where the pressure inside the pump is 12 Mpa).

Thus, for the purpose of securing a relief property that is essential to the electromagnetic valve 17 for a variable discharge fuel supply apparatus, it is necessary to increase the distance of the valve lift and extend the seat diameter for a conventional electromagnetic valve 17. When increasing the distance of the valve lift, the fact that the slope representing the valve lift distance-opening area property is dependent on the tapering rate of the tapered seating section must be taken into account (see the equation in FIG. 16). While, when extending the seat diameter, the fact that the slope representing the seat diameter-spring strength property jumps with an increase in the seat diameter must be taken into account (see the equation in FIG. 17).

Thus, when improving the relief property in a conventional apparatus, such problems as the enlargement of the electromagnetic valve 17 and consequential increase in the electric current consumption and lowering of responsiveness that could occur due to the reasons described above must be confronted. Further, the heat generated at the solenoid coils 22 within the electromagnetic valve 17 could increase, and this could induce a shortage between the lines and a malfunction of the electromagnetic valve due to disconnection and the like, and in the worst case, the control of discharge could be put in disorder.

The present invention therefore has as its object the improvement of the relief property and responsiveness, and the provision of an electromagnetic valve for a variable discharge fuel supply apparatus with a small electromagnetic valve, reduced electric current consumption and improved responsiveness.

DISCLOSURE OF INVENTION

The present invention is an electromagnetic valve for a variable discharge fuel supply apparatus comprising an electromagnetic valve body having a fuel flow path to be connected to a fuel supply apparatus, a valve seat disposed within said fuel flow path, a valve for opening or closing said fuel flow path by coming into or out of contact with said valve seat within said electromagnetic valve body and electromagnetic solenoids for causing said valve to move to said valve seat, and maintaining the fuel discharge from said fuel supply apparatus at a predetermined level, wherein said valve seat has a valve seating surface present in a flat surface facing the direction of movement of said valve at substantially right angle, and said valve is provided with said flow path formed therein and a substantially ring-shaped flat landing surface that encircles said flow path formed within said valve and closes said flow path by coming into contact with said valve seating surface.

The electromagnetic valve for a variable discharge fuel supply apparatus is connected to said fuel supply apparatus so that the outside of said valve serves as a high pressure side and said flow path within said valve serves as a lower pressure side.

The landing surface of said valve is ring-shaped, and the valve seating surface of said valve seat is ring-shaped, and so said valve may come into contact with said valve seat only through the space between the outer boundary of said landing surface of said valve and the inner boundary of said valve seating surface of said valve seat.

Said flow path may be formed in a place where it passes the vicinity of said electromagnetic solenoids at the downstream section of said valve.

Further, the flow path within the valve may pierce the valve, extend as far as the vicinity of solenoid coils, and be connected to the fuel flow path that is formed in the space between the valve outer boundary and the valve holder inner boundary and linked to the low pressure side.

Said valve seat having said valve seating surface may be a part formed separately from said valve holder instead of the one united to said valve.

BEST MODES FOR CARRYING OUT THE INVENTION

Figure 1:
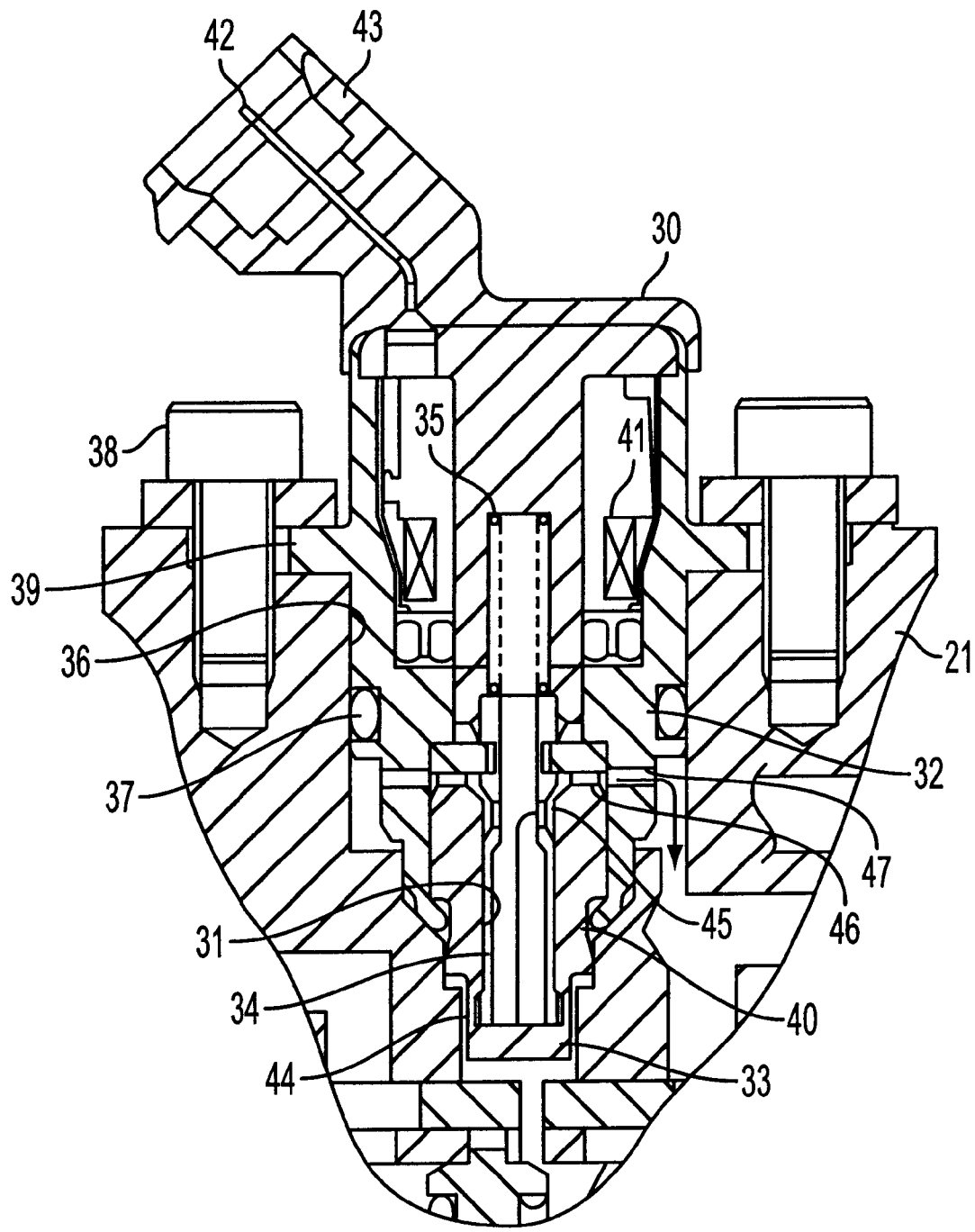
FIG. 1 is a longitudinal sectional view showing the structure of the electromagnetic valve for a variable discharge fuel supply apparatus according to the present invention.
Figure 13:
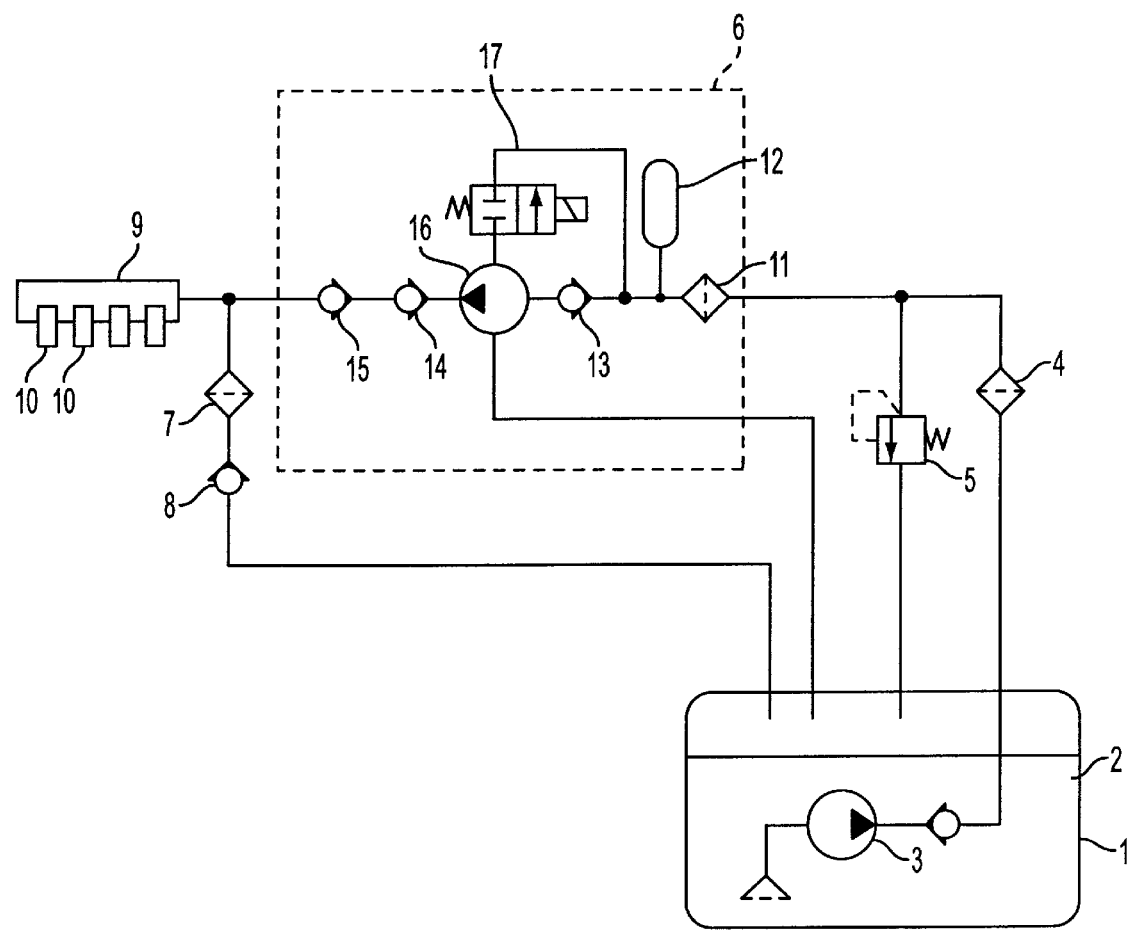
FIG. 13 is a schematic view of a typical fuel supply system whereto the electromagnetic valve for a variable discharge fuel supply apparatus according to the present invention is applicable.
Figure 14:
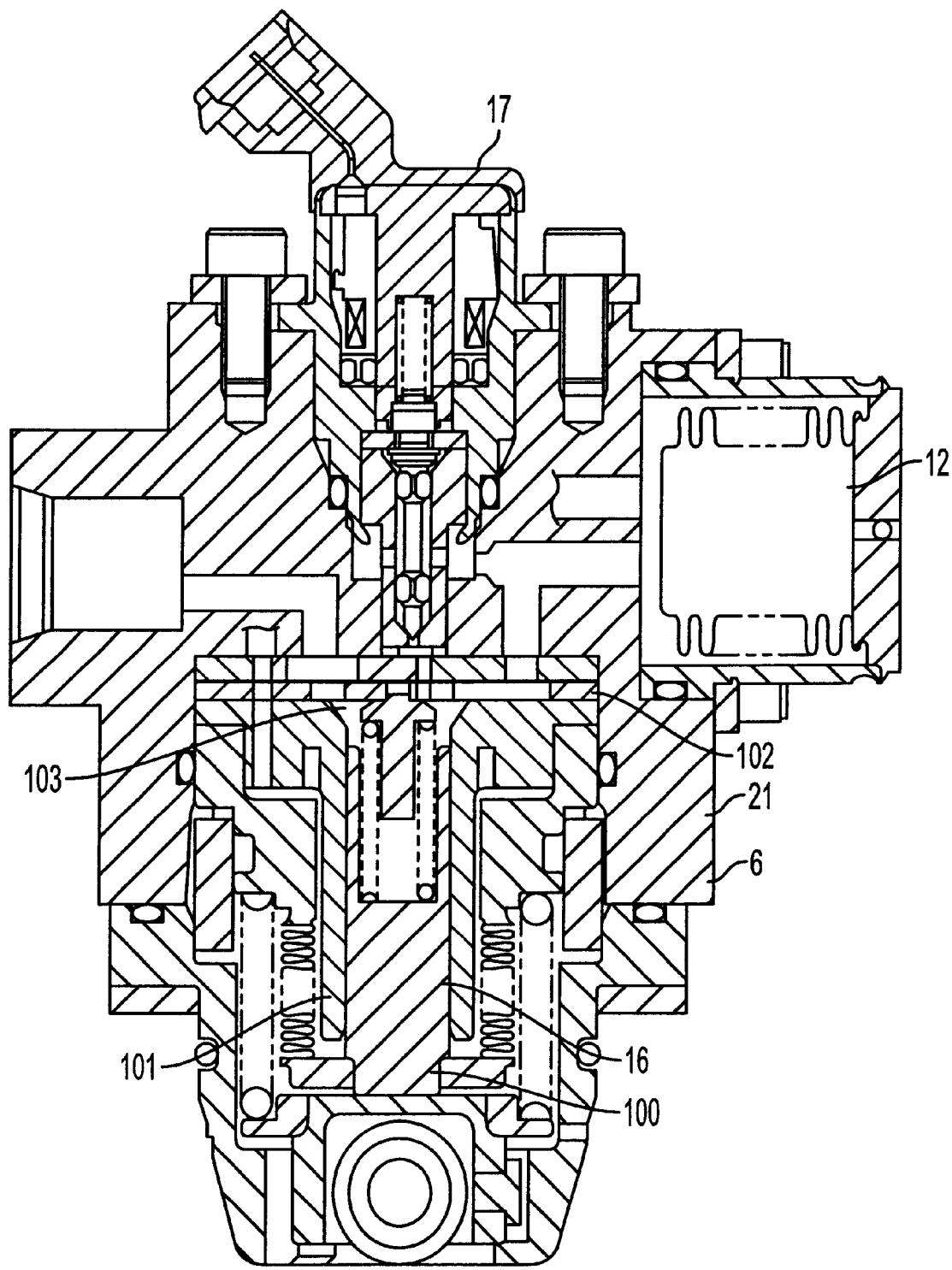
FIG. 14 is a schematic view of a conventional variable discharge fuel supply apparatus.
Figure 15:
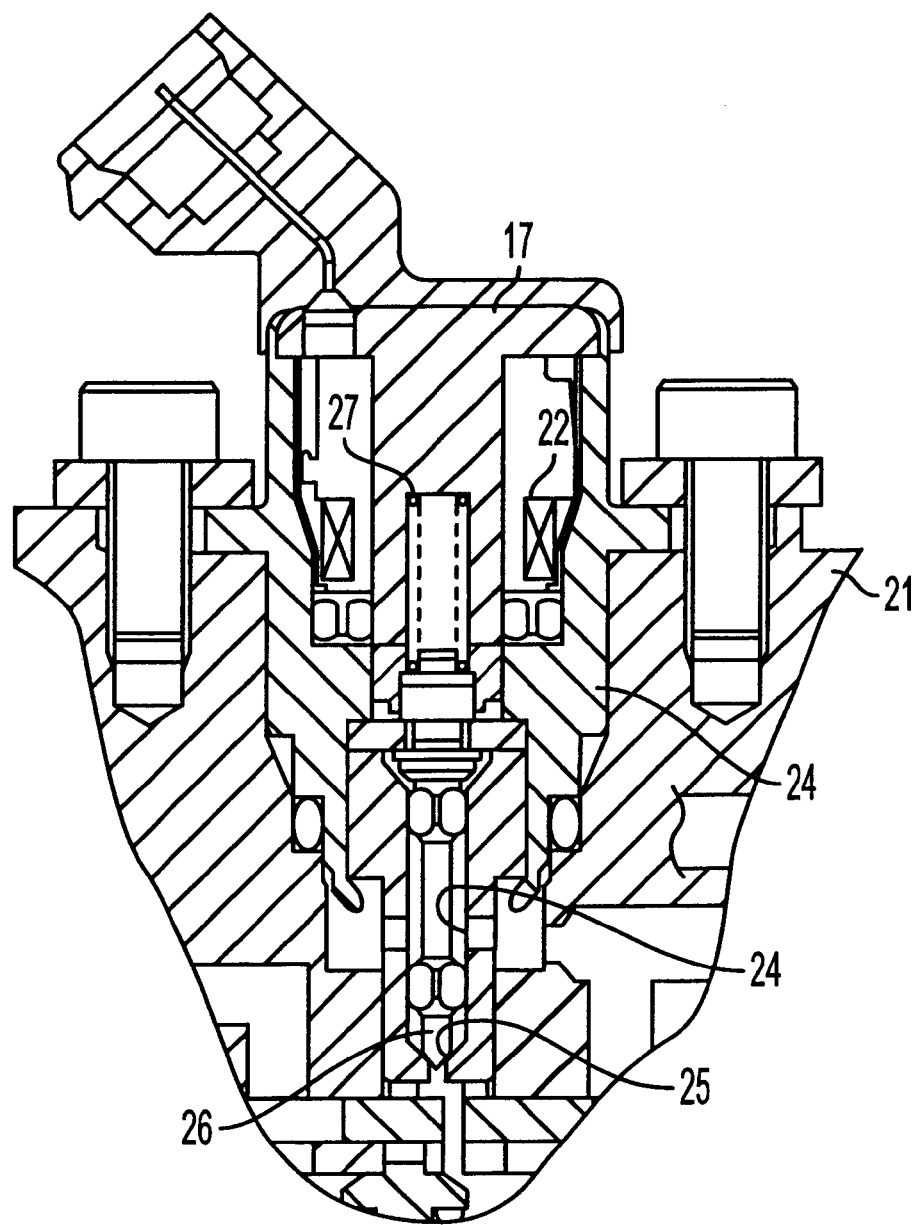
FIG. 15 is a longitudinal sectional view showing the structure of the electromagnetic valve for the variable discharge fuel supply apparatus of FIG. 14.
Figure 16:
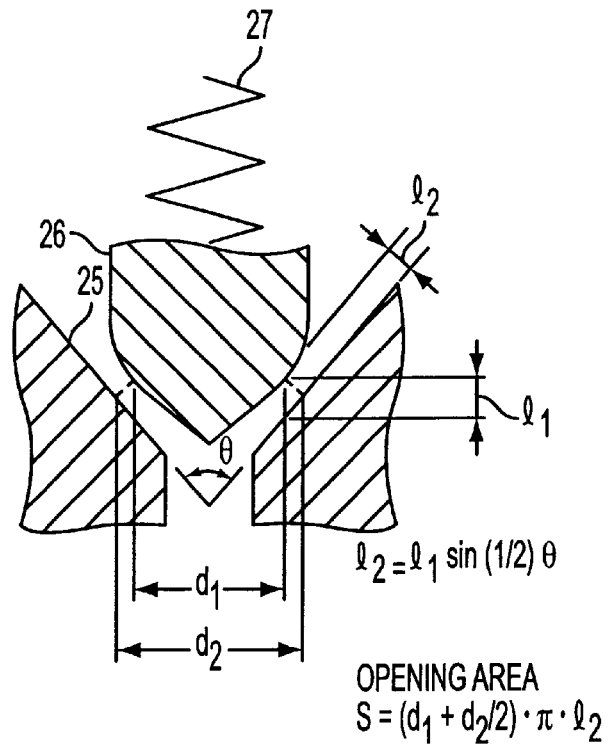
FIG. 16 is a schematic partial sectional view showing the valve of a conventional electromagnetic valve in a state in which it is in an open position to the valve seat.
Figure 17:
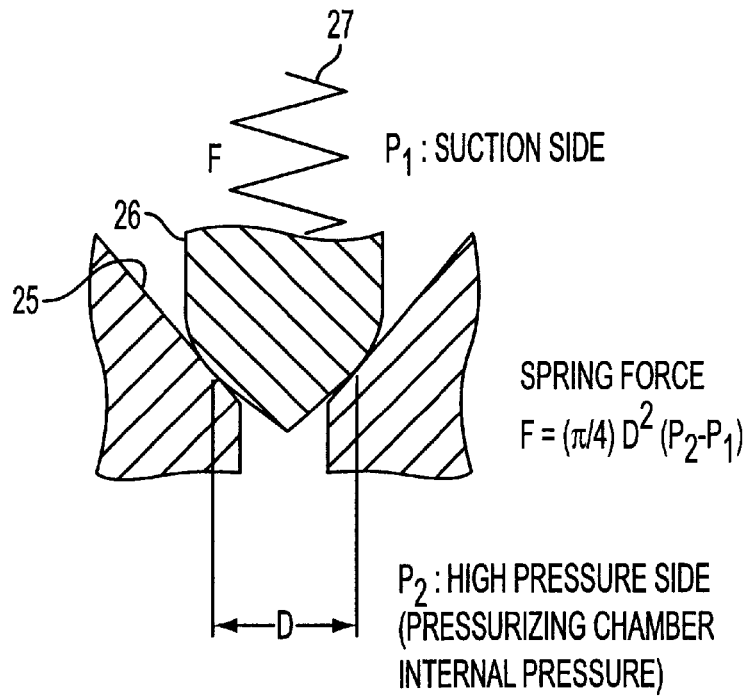
FIG. 17 is a schematic partial sectional view showing the valve of a conventional electromagnetic valve in a state in which it is in a closed position to the valve seat.
Figure 18:
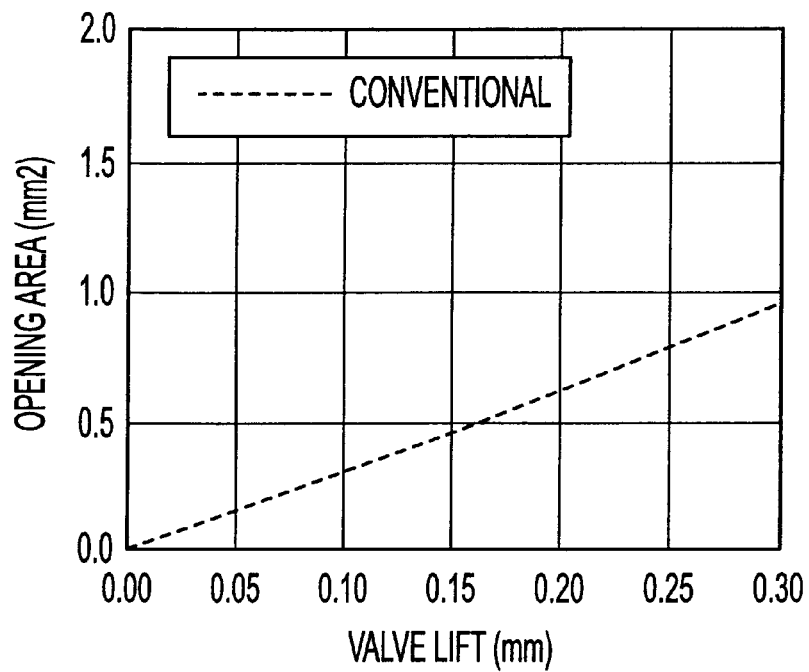
FIG. 18 is a graph showing the opening area (mm$_2$) relative to the valve lift (mm) in a conventional electromagnetic valve.
Figure 19:
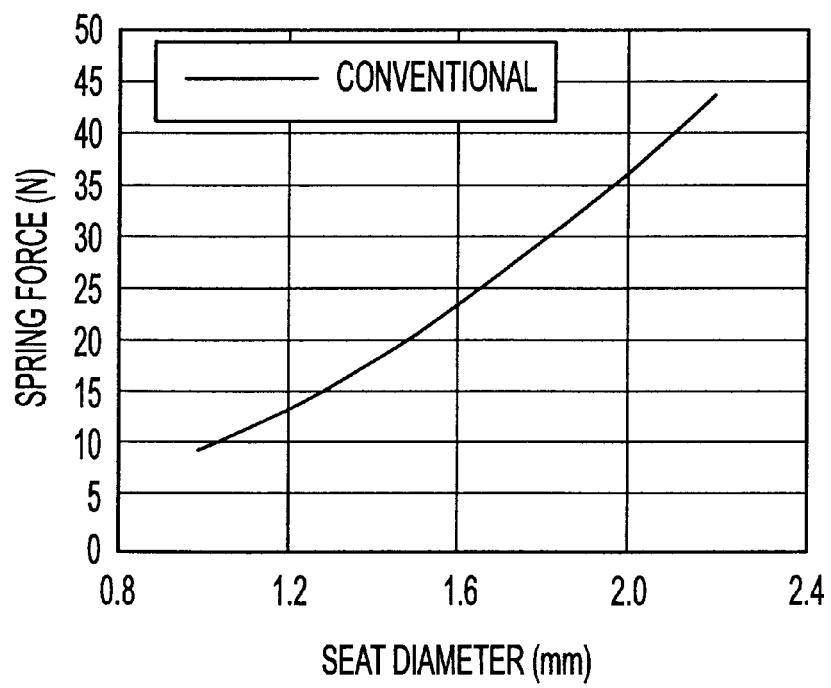
FIG. 19 is a graph showing the strength (N) requisite for the spring to cope with the varying seat diameter (mm) in a conventional electromagnetic valve.

The electromagnetic valve 30 for a variable discharge fuel supply apparatus according to the present invention shown in FIG. 1 comprises an electromagnetic valve body 32 having a fuel flow path 31 to be connected to a high-pressure pump 6, or a fuel supply apparatus (FIG. 13), a valve seat 33 formed within the fuel flow path 31, a valve 34 for opening or closing the fuel flow path 31 by coming into or out of contact with the valve seat 33 within the electromagnetic valve body 32, and electromagnetic solenoids 35 for causing the valve 34 to move to the valve seat 33, and maintains the fuel discharge from the fuel supply apparatus 6 at a predetermined level.

In the electromagnetic valve 30 for a variable discharge fuel supply apparatus shown in FIG. 1, the primarily cylindrical electromagnetic valve body 32 is fastened to a fuel supply apparatus casing 21 by fitting flanges 39 that are inserted liquid tight by O rings 37 into cylindrical holes 36 formed in the fuel supply apparatus and fastened with machine bolts 38. A cylindrical central hole is formed in the electromagnetic valve body 32 on the side of the inner end thereof, and a valve holder 40 is fitted in the central hole and secured with a pair of self-locking nut. A flow path 31 with the inner end thereof being closed axially by the flat board-like valve seat 33 as described later is formed in the center of the valve holder 40, and a primarily hollow cylindrical valve 34 is inserted in the flow path 31 in a way in which it can slide axially and also comes into contact with the inner surface of the flat valve seat 33 at its tip. A compression spring 35 is disposed at the other end of the cylindrical valve 34 so that the valve 34 can leave the valve seat 33 and move to an open position, striving against the action of the compression spring 35 with the electromagnetic force, when solenoid coils 41 wound around the cores fastened to the electromagnetic valve body 32 are activated. A terminal 42 of the solenoid coils 41 is lead through the cores to reach into a connector 43 molded out of a synthetic resin so that it can be connected to the unillustrated outer circuit.

Figure 2:
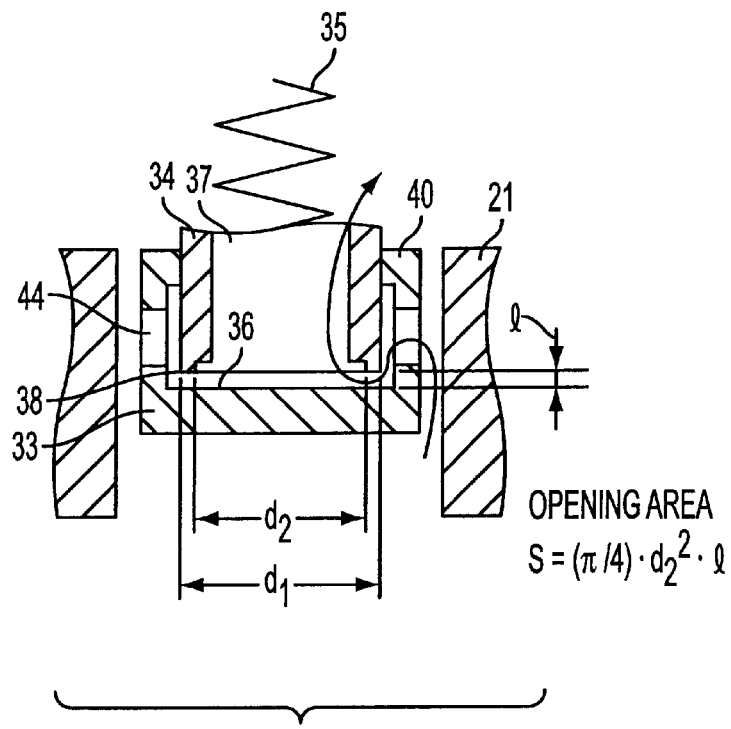
FIG. 2 is a schematic partial sectional view showing the valve of the electromagnetic valve of FIG. 1 in a state in which it is in an open position to the valve seat.
Figure 3:
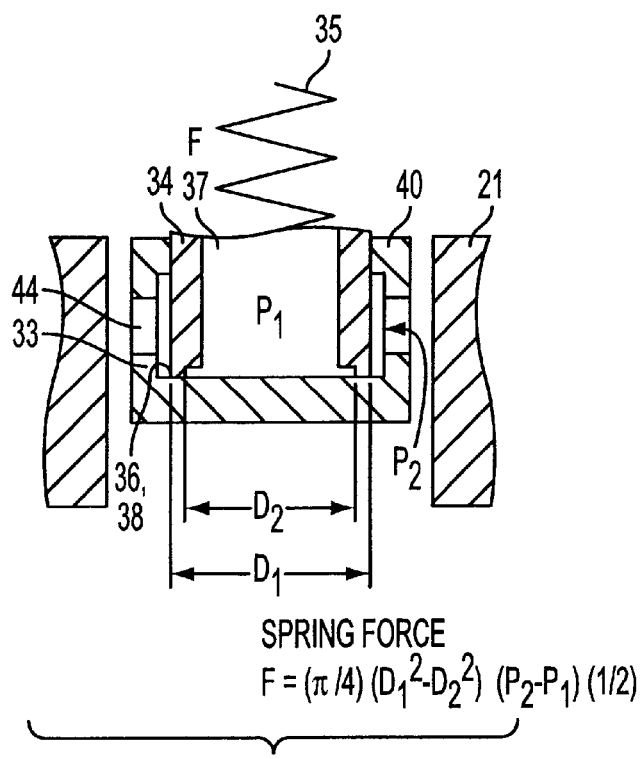
FIG. 3 is a schematic partial sectional view showing the valve of the electromagnetic valve of FIG. 1 in a state in which it is in a closed position to the valve seat.

As shown in FIGS. 2 and 3, although the valve holder 40 of the electromagnetic valve body 32 is closed at its inner end axially by the flat board-like valve seat 33, a plurality of apertures 44 opening at a right angle to the axis of the valve 34 are formed along the surrounding wall thereof at a place close to its tip and slightly above the valve seat 33 in the Figures, and these apertures 44 are connected to the fuel pressuring room 103 constituted by the plunger 100, the sleeve 101, the plate 102, the suction valve 13 and the discharge valve 14 of the fuel supply apparatus 6, or a high-pressure pump, to serve as a high pressure side in the discharge process.

The fuel flown into the fuel flow path 31 within the valve 34 after being sent out of the fuel pressuring room 103 and passing through the openings 44 creeps up the inner wall of the valve 34 axially toward the upper direction in FIG. 1 when the valve 34 is in an open position as shown in FIG. 2, overflows through radial flow paths 45 formed in the valve 34 to pierce the tubular wall thereof at the position about half its length, then passes through each of radial flow paths 46 and 47 extending radially by piercing cylindrical walls of the valve holder 40 and the electromagnetic valve body 32, and eventually is released into the fuel flow path on the low pressure side after passing across the surrounding wall of the electromagnetic valve body 32.

As shown in FIGS. 2 and 3, the valve seat 33 of the electromagnetic valve 30 for a variable discharge fuel supply apparatus according to the present invention has a circular valve seating surface 36 present in a flat surface facing at a primarily right angle the axis of the valve 34, or the direction of its movement, while the valve 34 is, in addition to the flow path 37 formed within the valve 34, provided at its tip with a primarily ring-shaped landing surface 38 that encircles the flow path 37 and closes the flow path 37 to the high pressure side when put in a closed position wherein it is in contact with the valve seating surface 36.

FIG. 2 is a schematic partial sectional view showing the valve 34 of the electromagnetic valve 30 in a state in which it is in an open position to the valve seat 33. FIG. 3 is a schematic partial sectional view showing the valve 34 of the electromagnetic valve 30 in a state in which it is in a closed position to the valve seat 33. In the electromagnetic valve 30 according to the present invention, a flat seal is used, and it is so constituted that the high-pressure side is in the side opposing to the spring 35 with the valve seat 33 being a flat and primarily circular seating surface and the valve 34 being a ring-shaped member present in a flat surface.

Figure 4:
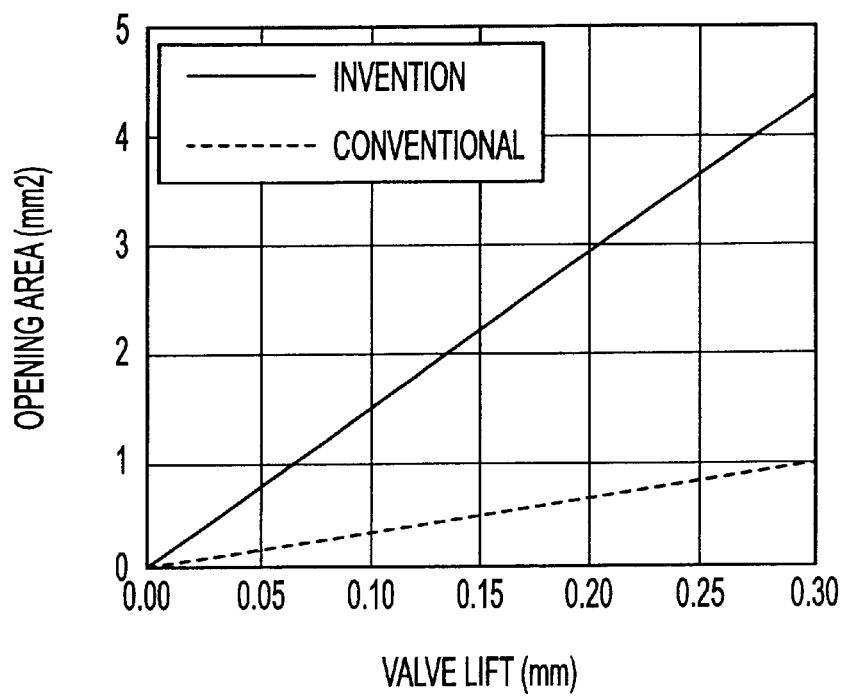
FIG. 4 is a graph showing the opening area (mm$^2$) relative to the valve lift (mm) in the electromagnetic valve.
Figure 5:
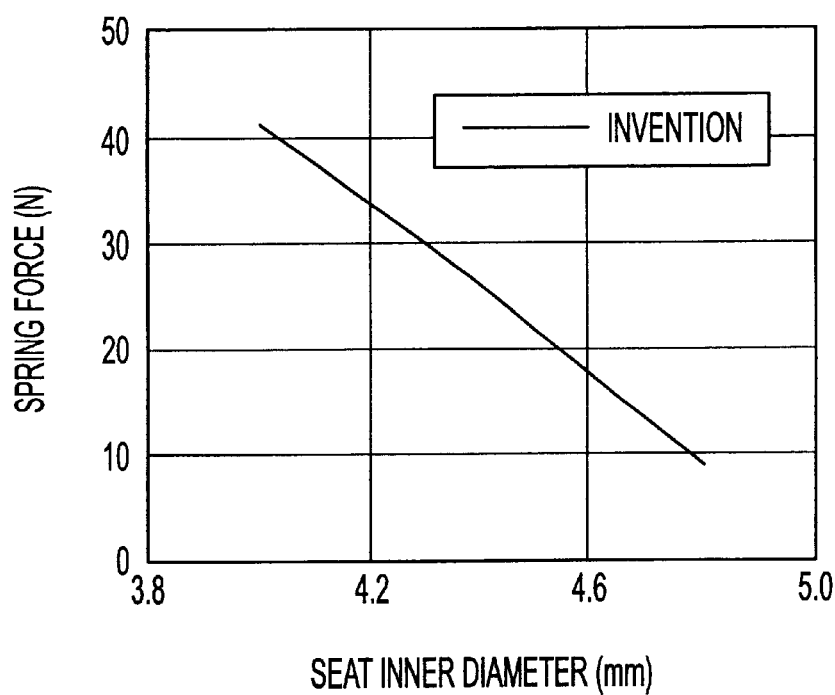
FIG. 5 is a graph showing the strength (N) requisite for the spring to cope with the varying seat diameter (mm)

An opening area S (mm$^2$) relative to a valve lift I (mm) in an electromagnetic valve like the electromagnetic valve 30 is expressed by the equation shown in FIG. 2 and varies in a way as shown in the graph given in FIG. 4. The strength (N) requisite for the spring to cope with the varying seat diameter (mm) is as expressed by the equation shown in FIG. 3, and varies in a way as shown in the graph given in FIG. 5 (showing the case where the pressure inside the pump is 12 Mpa). As can be seen from these graphs, it is possible to maximize theoretically the rate of increase in the opening area S relative to the valve lift 1, and so the valve lift relative to the necessary opening area can be set at a minimum level. In addition, it is possible to lessen the increase in the strength of spring to cope with the expansion of seat diameter by varying the inner diameter set for the seating section in relation to the increase in the strength of spring when seat diameter is expanded.

Thus, by the electromagnetic valve for a variable discharge fuel supply apparatus according to the present invention, it is possible to provide an electromagnetic valve for a variable discharge fuel supply apparatus with significantly improved relief property and responsiveness, in which the dimension as a whole is not increased.

Incidentally, in the electromagnetic valve 30 for a variable discharge fuel supply apparatus according to the present invention, a trace leakage could occur at a narrow space between the piston and the valve body in FIG. 1 because a high pressure of fuel is applied at a right angle to the axis of the valve 34, or the direction of action of the spring 35. Thus, it is necessary to reduce the leakage to a level having no effect on the pump discharge from the variable discharge fuel supply apparatus by selecting said space and the sealing distance at appropriate levels.

Figure 6:
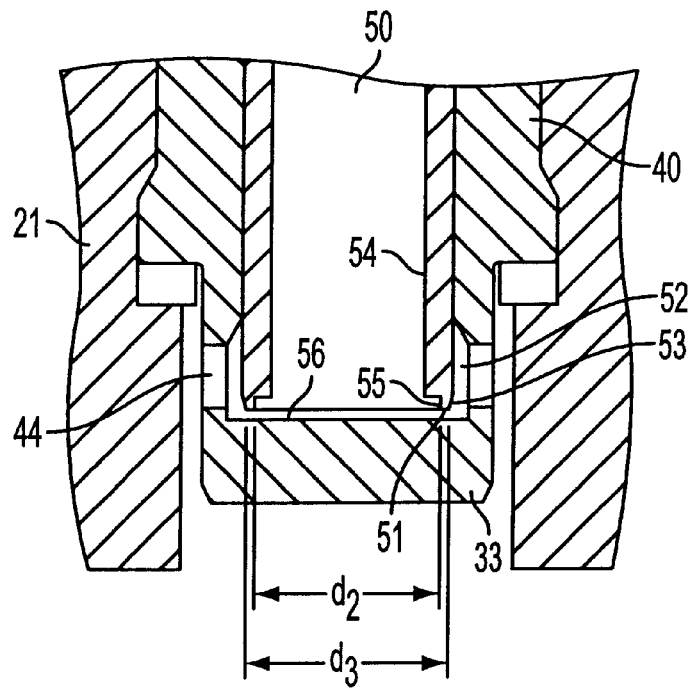
FIG. 6 is a sectional view showing one embodiment of the present invention.

FIG. 6 is a schematic partial sectional view showing the relationship between a valve 50 and the valve seat 33 in an open position in another embodiment of the electromagnetic valve for a variable discharge fuel supply apparatus according to the present invention. A landing surface 51 of the valve 50 formed between an outer boundary 53 (a tip diameter d3) that is tapered as a result of a gradual inward decrease in the diameter from an outer boundary 52 at the tip of the valve 50 and an inner boundary 55 (a diameter d2) that is stepped as a result of a stepwise increase in the diameter over an inner boundary 54 at the tip of the valve 50 is a ring-shaped landing surface present in a flat surface. A valve seating surface 56 of the valve seat 33 and the landing surface 51 of the valve 50 are concentric circular flat surfaces although the valve seating surface 56 has a larger diameter than the landing surface 51. Thus, the seating area between the valve 50 and the valve seat 33 is the area of a ring-shaped section formed between the circle with diameter d3 and the circle with diameter d2. By a valve like the valve 50, it becomes easy to control the seating area accurately, and it is possible to improve processability and to cut down the price of the product.

Figure 7:
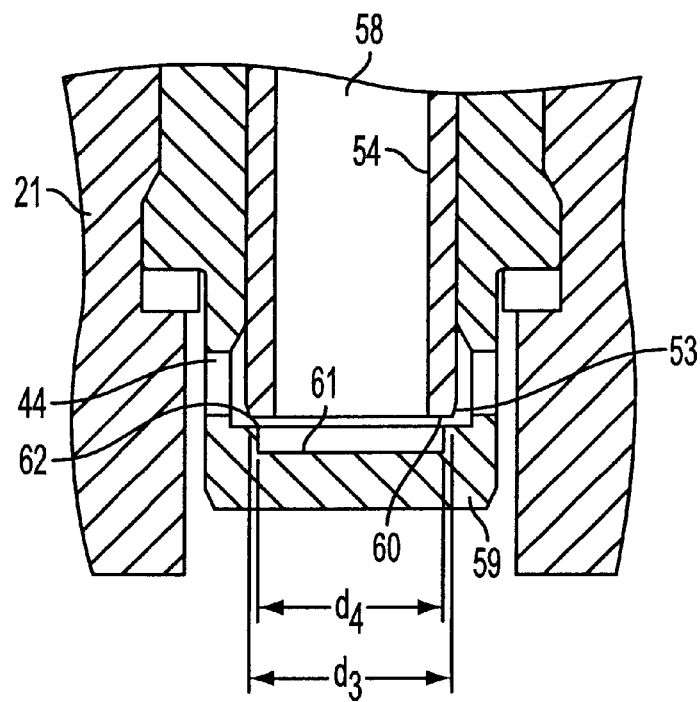
FIG. 7 is a sectional view showing another embodiment of the present invention.

FIG. 7 is a schematic partial sectional view showing the relationship between a valve 58 and a valve seat 59 in an open position of yet another embodiment of the electromagnetic valve for a variable discharge fuel supply apparatus according to the present invention. A landing surface 60 of a valve 58 formed between the outer boundary 53 (a diameter d3) that is tapered as a result of a gradual inward decrease in the diameter from the outer boundary at the tip of the valve 58 and the inner boundary 54 at the tip of the valve 58 is a ring-shaped landing surface present in a flat surface. The valve seat 59 and the landing surface 60 of the valve 58 are concentric circular flat surfaces although the valve seat 59 has a larger diameter than the landing surface 60 and is provided with a circular opening 61 in the middle thereof. The diameter of the circular opening (a diameter d4) is larger than the diameter of the inner boundary 54 of the valve 58 but is smaller than the diameter of the tapered outer boundary 53. In other words, the seating section is defined by the valve side (the tapered outer boundary 53) at the outer perimeter and by the seat side (the circular hole 61) at the inner perimeter. A valve seating surface 62 of the valve seat 59 is ring-shaped, and the valve 58 is in contact with the valve seat 59 only through the space between the outer perimeter of the landing surface 60 of the valve and the inner perimeter of the valve seating surface 62 of the valve seat 59. Thus, the seating area of the valve is the area of the ring-shaped section formed between the circle with diameter d3 and the circle with diameter d4. By a valve tip like this, it becomes easy to control the seating area accurately, and it is possible to improve processability and cut down the price of the product. In addition, the one shown in FIG. 6 as one embodiment could deformed due to high pressure if the valve tip thereof is formed thin in order to reduce the seating area, while by the structure of this embodiment it is possible to prevent deformation under high pressure and to provide a stabilized sealing property under high pressure since there would be no reduction in the rigidity on the piston side.

Figure 8:
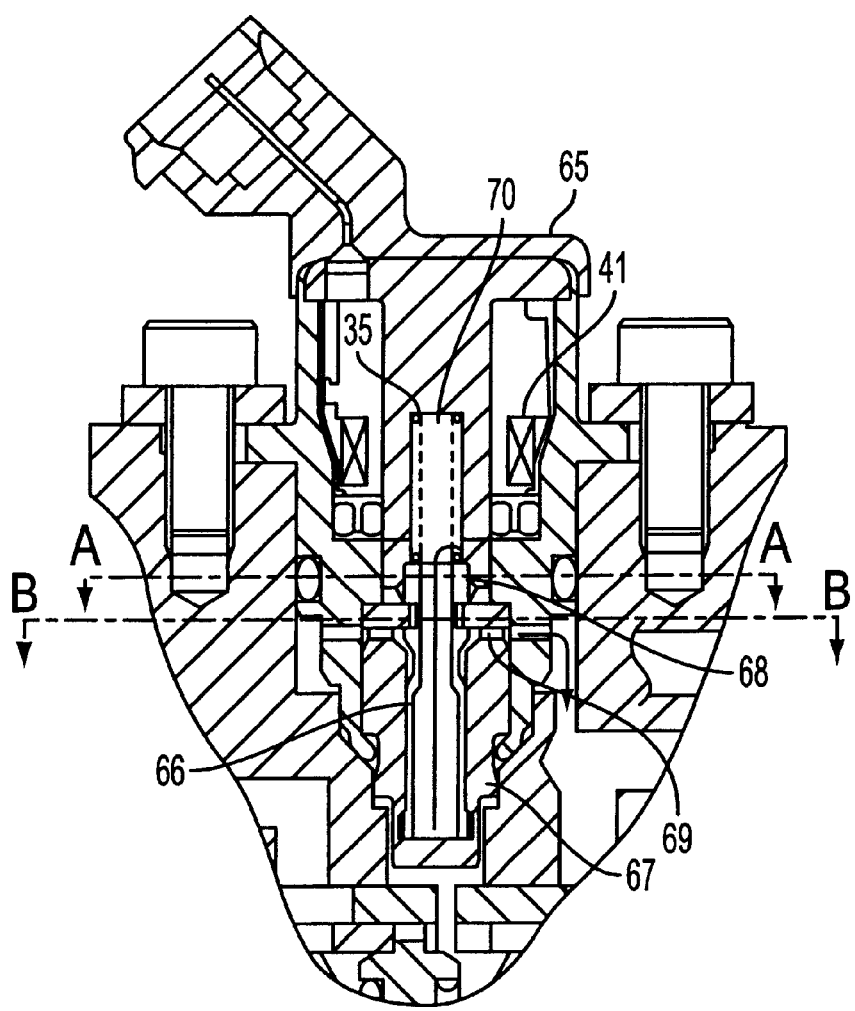
FIG. 8 is a sectional view showing yet another embodiment of the electromagnetic valve for a variable discharge fuel supply apparatus according to the present invention.
Figure 9:
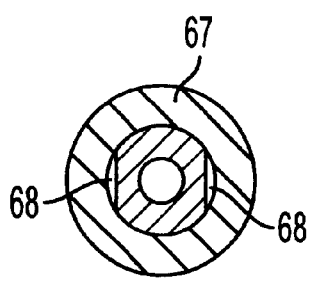
FIG. 9 is a sectional view taken along line A—A of FIG. 8.
Figure 10:
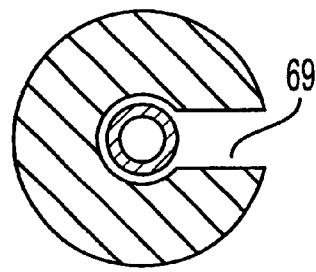
FIG. 10 is a sectional view taken along line B—B of FIG. 8.

In an electromagnetic valve 65 for a variable discharge fuel supply apparatus in the embodiments shown in FIGS. 8–10, no radially piercing flow path 45 (see FIG. 1) formed across the cylindrical walls of the hollow cylindrical valves 34, 50 and 58 at the place about half their height in several embodiments described above in relation to FIGS. 1–7 is formed. Instead, the flow path within a valve 66 extends as far as the upper end in the Figures of a tubular valve 66. The cylindrical surface at the outer boundary of the valve 66 is partly cut out or scraped off at the upper end thereof, as well shown in FIG. 9, leading to the formation of a pair of opposing fuel flow paths 68 each having a half-moon-shaped cross section in the space between the valve 66 and the inner boundary of a valve holder 67. The fuel flow paths 68 are, as shown in FIG. 10, linked to a radial flow path 69 that is formed in the valve holder 67 and connected to the low-pressure side fuel supply route. Thus, after creeping up the flow path within the valve 66 and flowing over the upper end thereof, the fuel flows into a space 70 wherein the spring 35 extending as far as the inside of the solenoid coils 41 is disposed and then after flowing through the cut-out fuel flow paths 68 in the outer boundary of the valve it runs into the radial flow path 69 and is released to the low-pressure side.

According to this embodiment, because the flow path of fuel extends as far as the upper end of the valve 66 and is extended so that it passes the vicinity of the electromagnetic solenoids 41 on the downstream side of the valve 66, it is possible to cool down the heat generated at the solenoid coils 41 with the fuel, and serves in cooling down the electromagnetic valve 65. Further, it is easy to manufacture the valve 66 because it is not necessary to form any radially piercing openings in the cylindrical valve 66, but the formation only of the cut-out sections 68 in a part of the outer boundary thereof will do.

Figure 11:
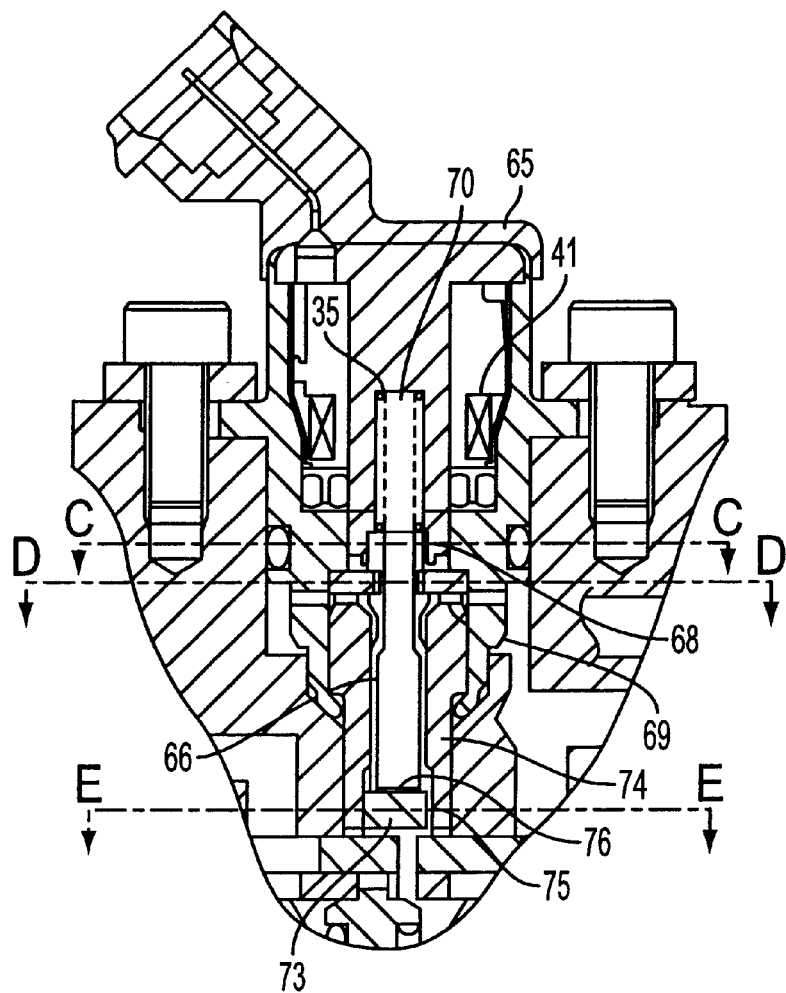
FIG. 11 is a sectional view showing yet another embodiment of the electromagnetic valve for a variable discharge fuel supply apparatus according to the present invention.
Figure 12:
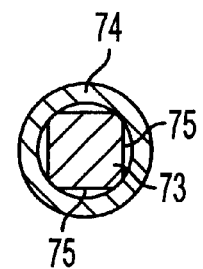
FIG. 12 is a sectional view taken along line E—E of FIG. 11.

In the embodiments shown in FIGS. 11 and 12, a valve seat 73 providing a flat seating surface is the one formed by uniting parts other than a valve holder 74 by suitable uniting techniques including welding. In the illustrated example, the valve seat 73 which is a substantially square board member with the four corners thereof being fastened to the inner boundary of the valve holder 74 is providing a flat valve seating surface 76 matching the landing surface of the valve 66 as well as fuel flow paths 75 formed in the space between each section corresponding to the sides of the square and the inner boundary of the valve holder 74. By the structure like this, it is easy to manufacture and process the electromagnetic valve 66, and it is possible to increase the product reliability and also to cut down the product price because the fuel flow paths are simplified.

INDUSTRIAL APPLICABILITY

As described in the above, the electromagnetic valve for a variable discharge fuel supply apparatus according to the present invention is of use as an apparatus for controlling variably the discharge of high-pressure fuel from a high-pressure pump, or a fuel supply apparatus in a fuel supply system of the fuel injection type in an internal combustion engine for automobiles.

What is claimed is:

1. An electromagnetic valve for a variable discharge fuel supply apparatus, said electromagnetic valve comprising:

an electromagnetic valve body having a fuel flow path to be connected to a space between a high-pressure side and a low-pressure side of a fuel supply apparatus;

a valve seat formed within said fuel flow path;

a valve for opening or closing said fuel flow path by coming into or out of contact with said valve seat within said electromagnetic valve body; and electromagnetic solenoids for causing said valve to move toward said valve seat, and maintaining fuel discharge from said fuel supply apparatus at a predetermined level;

wherein said valve seat has a valve seating surface present in a flat surface facing a direction of movement of said valve at a substantially right angle, and said valve is provided with said flow path formed within said valve and a substantially ring-shaped flat landing surface that encircles said flow path within said valve and closes said flow path by coming into contact with said valve seating surface.

2. The electromagnetic valve for a variable discharge fuel supply apparatus as claimed in claim 1, wherein said electromagnetic valve is connected to said fuel supply apparatus so that an outside of said valve serves as a high pressure side and said flow path within said valve serves as a low pressure side.

3. The electromagnetic valve for a variable discharge fuel supply apparatus as claimed in claim 1, wherein the landing surface of said valve is ring-shaped, and said valve seating surface of said valve seat is ring-shaped, and said valve contacts said valve seat only through a space between an outer boundary of said landing surface of said valve and an inner boundary of said valve seating surface of said valve seat.

4. The electromagnetic valve for a variable discharge fuel supply apparatus as claimed in claim 1, wherein said flow path passes a vicinity of said electromagnetic solenoids at a downstream section of said valve.

5. The electromagnetic valve for a variable discharge fuel supply apparatus as claimed in claim 1, wherein the flow path within the valve extends through the valve to reach as far as a vicinity of the solenoids and is connected to another fuel flow path that is formed in the space between a valve outer boundary and a valve holder inner boundary and is linked to a low pressure side.

6. The electromagnetic valve for a variable discharge fuel supply apparatus as claimed in claim 1, wherein said valve seat having said valve seating surface is a part formed separately from a valve holder.

7. The electromagnetic valve for a variable discharge fuel supply apparatus as claimed in claim 1, wherein the valve seat is disposed at the outermost circumference of the valve.

* * * * *